Dec. 13, 1932.    J. J. LERAY    1,890,519
HELICOPLANE
Filed April 13, 1932    2 Sheets-Sheet 1
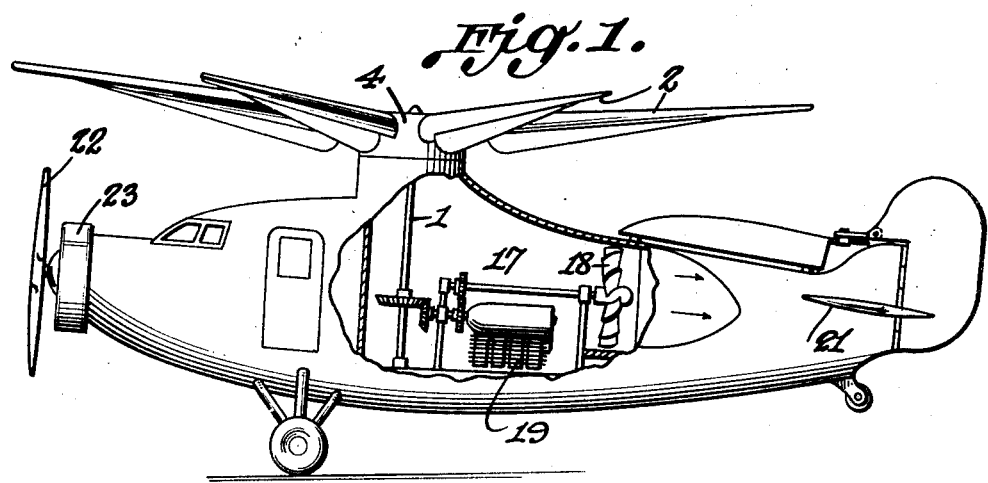
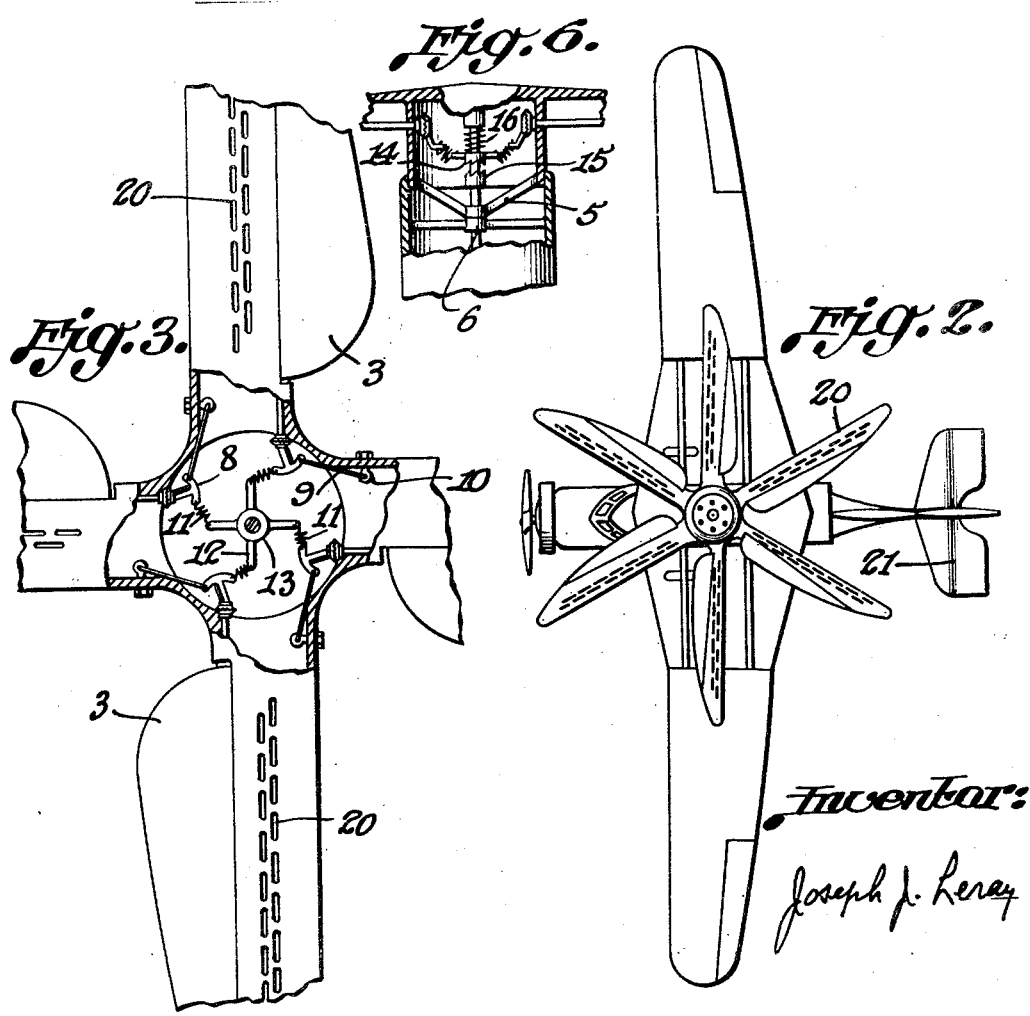
Inventor:
Joseph J. Leray Dec. 13, 1932.   J. J. LERAY   1,890,519
HELICOPLANE
Filed April 13, 1932   2 Sheets-Sheet 2

Inventor:
Joseph J. Leray

Patented Dec. 13, 1932

1,890,519

UNITED STATES PATENT OFFICE

JOSEPH J. LERAY, OF WEST WARWICK, RHODE ISLAND

HELICOPLANE

Application filed April 13, 1932. Serial No. 604,963.

The invention relates to improvement in helicoplanes, aircrafts combining the helicopter and airplane, capable to ascend vertically by means of rotating wings or airscrews, and fly horizontally by means of said airscrews and fixed wings; and to assure the vertical ascent a further improvement in the invention is to increase the lifting capacity of airscrews by internal suction developing vacuum on the upper surface of the blades and obtain sustaining lift with airscrews rotating at a smaller speed or being reduced in size, making said airscrews suitable for combination with fixed wings.

Figure 4:
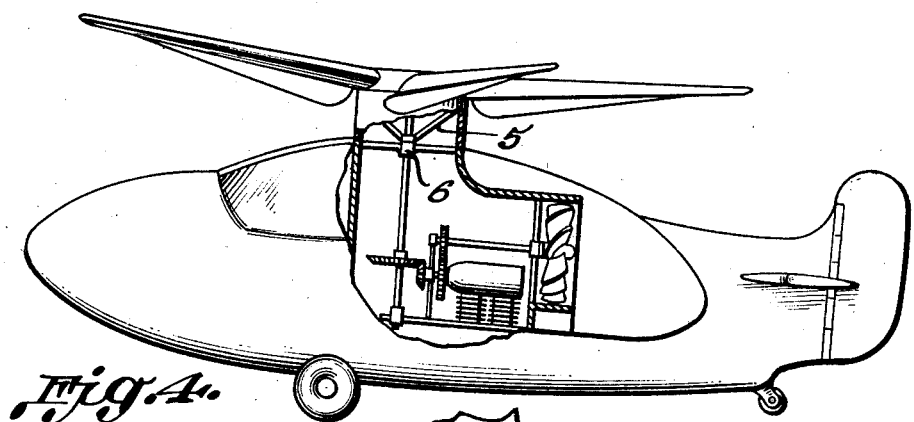
Figure 5:
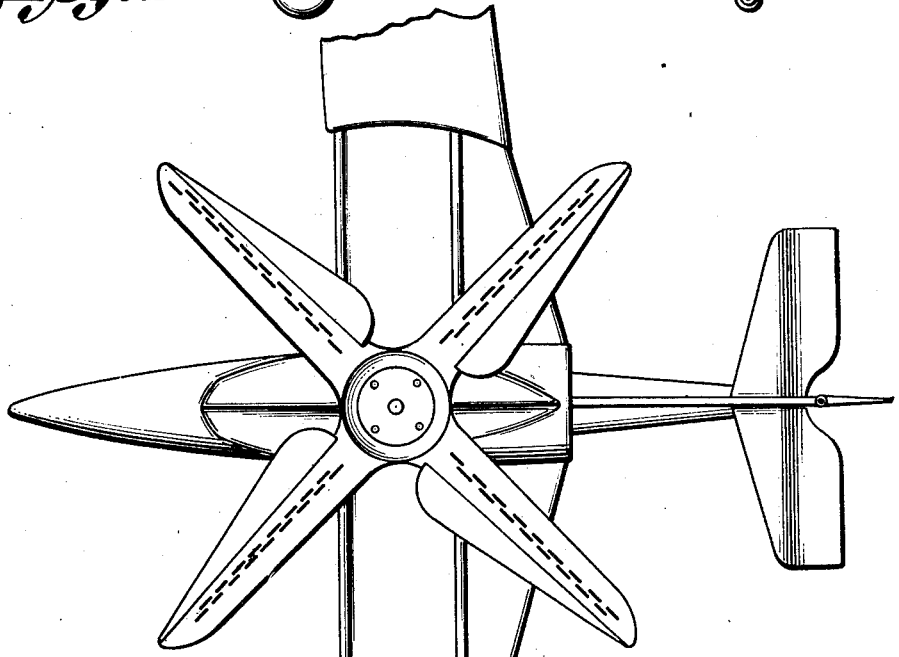

The invention is illustrated in the accompanying drawings, in which Fig. 1 is a profile view of the helicoplane with a part of the fuselage cut out to show the interior. Fig. 2 is a plan view of the same helicoplane shown on Fig. 1. Fig. 3 is a detail plan view of the airscrew hub, showing the arrangement for transmission of power from the shaft to the airscrew. Fig. 4 is a profile view of an alternative design without nose motor, suitable for gliding purpose. Fig 5 is a plan view of the same alternative design. Fig. 6 is a sectional view of the hub of the rotating wing or airscrew.

According to the invention, the fuselage or body of the helicoplane carries at about the center of balance of the aircraft a rotatable vertical shaft, 1, Fig. 1 extending upwardly having at the upper end rotating wings assembled together into an airscrew with a hollow large hub, 2, turning freely around said shaft. The airscrew has thick hollowed blades, tapering in thickness, with flaps, 3, Fig. 3, hinged to the trailing edge; said blades being united and held together by a large hollow hub, 4, the internal cavity of said hub and blades being in communication. Said hub is supported and secured to a journal, 5, Fig. 6, turning on a bearing, 6, secured to a structural member of the fuselage, supporting and retaining in place said journal and the vertical shaft.

The leading edge or hinged edge of the flap is formed by a bar or tubing, 7, Fig. 3, extending into the interior of the hub, and having an arm secured to its end, which has two branches forming a T, 8; to one branch of said T arm is attached a rubber strand, 9, whose other end of said rubber strand is attached to a bolted eye, 10, inside the following blade. The opposite branch of the T arm is attached by a tension spring, 11, to an arm, 12, secured to a boss, 13, revolving around the vertical shaft, 1. The boss, 13, carries on its under side a jaw, 14, Fig. 6, engaging a similar one, 15, secured to the vertical shaft, said jaws providing the means to transmit the power imparted to the vertical shaft to the boss and from the boss to the airscrew, turning it in one direction, the boss, 13, being pressed into engagement by a compression spring, 16, Fig. 6, placed around the shaft above the boss.

The said described transmission providing shock-absorber in application of power, providing automatic equalization of power between the blades at all points of the disc of rotation, automatically adjusting the incidence of the blades in a feathering action compensating for the difference of pressure in an advancing blade and a retreating one, and permitting the airscrew to continue to rotate freely in the designed direction when the vertical shaft remains stationary with the propulsive power cut off, then the jaws slipping one over the other.

The power transmitted by the vertical shaft is received by the flap and tends to depress said flap to a designed limit coinciding with the designed maximum angle of incidence of the blade. With the power off, the flap raises itself up to a designed position under the action of a rubber strand, 9, Fig. 3, the limit being attained when the three pivoted joints come in a straight line. The raised attitude of the flap, when the power is off, gives the blades the correct angle of incidence to induce the airscrew to rotate freely in the original direction when the helicoplane assumes attitudes where the disc of rotation of the airscrew is at large angle of attack relatively to the flight path, as in vertical descent, stalled glide or steep banking.

The hollow hub just described fits over a circular opening on the top of the fuselage, nearly of the same diameter with only sufficient clearance to eliminate friction, the connection having pad of felt to render it as air tight as possible; said opening covered by the hub leads to an inside air chamber, 17, having another opening at the rear containing a powerful exhaust fan, 18, whose suction action empties the air from the chamber, 17, inside of the air chamber, is a motor, 19, with suitable gears to rotate the vertical shaft and airscrew and rotate simultaneously the exhaust fan, 18, whose sucking action develops vacuum in the chamber and interior of blades of airscrew, the outside air being allowed to enter the blades through series of slots or holes, 20, made in the wall of the upper surface of said blades. The rush of the air into said slots is opposed and retarded by the relative wind coming across the blades, said relative wind being generated by the rotation of the airscrew. The incoming current being obstructed and retarded by a cross current, the air around and above the slots becomes rarefied as the incoming flow is insufficient to furnish and fill up the exhausting capacity of the fan and a vacuum results above and around the slots or holes, said vacuum producing a powerful lifting moment, which is in addition to other lifting properties common to all airscrews.

This improvement offers the only solution to reduce airscrews to practical size and obtain ample lifting capacity; this improvement will obviate the necessity of high speed of rotation, inseparable with strong downwash or slipstream, which is objectionable with fixed wings.

To permit the slipstream of the airscrew to pass with the minimum resistance, the fixed wings are open at their root as shown on plan views Figs. 2 and 5.

The slipstream of the exhaust fan, 18, is arranged to come out in close proximity of the control surfaces at the tail and directs its blast directly into them, assuring complete controllability at very slow or zero speed of advance.

The helicoplane relies for its speed of advance on one or more propellers, 22, operated by suitable power plants, 23. The helicoplane may be constructed without other propellers, as shown on Figs. 4 and 5, making an aircraft suitable for gliding purpose.

The above described invention being completed with suitable means of support, attachment and control.

The helicoplanes as described having sufficient aerodynamic stability in ascending or descending vertically with their airscrew, require no additional controls than those found in conventional airplanes.

The improvement of the helicoplane is obvious as it incorporates all preexisting means of lift common to helicopter and airplane and adds another valuable source of lift obtained by suction.

From the above description of my invention, I claim,

1. In helicoplanes, a combination of helicopter and airplane, having wings horizontally fixed with open bays at their root, a rotatable vertical shaft on suitable bearings carrying an airscrew having hollow blades arranged and assembled together by and into a large hollow hub with inside communication with said blades; said hub, open underneath, covering the top opening and communicating with an air chamber formed by a portion of the fuselage; said air chamber having an exhaust fan pumping the air out of the air chamber through an opening at the rear, which opening encloses the exhaust fan which produces a slip stream directed at the tail surfaces for means of control, said fan developing an inside vacuum extending to air chamber, hub and blades of the airscrew; said blades having series of slots or holes in the wall of their upper surface, admitting the outside air by suction into the blades, said suction producing vacuum on the upper surface of the blades, said vacuum being increased by the relative wind, generated by the rotation, blowing across the path of the entering current; and having suitable motor and gears to turn the vertical shaft and rotate the airscrew connected to said vertical shaft and simultaneously rotate the exhaust fan directing its blast into the tail surfaces to assist the stability and maneuverability of the aircraft.

2. In helicoplanes, having fixed wings with open bays at their root, a rotatable vertical shaft carrying an airscrew with hollow hub and hollow blades with series of sucking slots on their upper surface and suitable power and fan for developing suction, flaps hinged to the trailing edge of the blades of the airscrew, said flaps having a member of their structure extending inside the hub, having secured at its end an arm with two branches with eyes for connection, one branch being connected with a tension spring to an arm secured to a center boss rotating freely around the vertical shaft, said boss having a jaw underneath secured to it engaging with another jaw secured to the vertical shaft for transmission of power from the shaft to the airscrew indirectly by way of the flap, said boss being pressed into engagement by a spiral compression spring placed above it around the vertical shaft: the other branch of the flap arm being connected to a rubber strand, which is attached at its other end inside the following blade, said rubber strand holding the flap raised when no power is applied; said described hub assembly providing equalization of power to each blade, automatically adjusting the incidence of the blade in accordance with the variation of the wind pressure around the disc of rotation, providing also shock absorber for sudden application of power and free rotation for the airscrew in its designed direction with the power off, the jaws slipping one over the other.

3. In helicoplanes, having fixed wings with open bays at their root, a rotatable vertical shaft carrying a hollow sucking airscrew with blades having slots or holes on their upper surface, connected to the vertical shaft by a hub assembly all enclosed inside of said hub, providing shock-absorber, equalization of power pressure, automatic adjustment of blade incidence and free rotation for the airscrew, said airscrew developing high vacuum lift by internal suction created by an exhaust fan, said fan and airscrew being rotated by a motor with suitable gears inside the air chamber, an airscrew carried and retained by the vertical shaft on ball bearing secured to the end of said vertical shaft, the airscrew being otherwise supported under by a journal secured to the hub above and turning, below, on ball bearing secured to a structural member of the fuselage, which holds and retains the shaft and journal in place, having also most of the essential parts usually found in conventional airplanes in suitable arrangement consistent with said claims.

4. In helicoplanes having fixed wings with open bays at their root, a rotatable vertical shaft carrying an airscrew with hollow blades and suction as in claim 2, said airscrew developing high vacuum lift by internal suction created by an exhaust fan, said fan and airscrew being rotated by a motor with suitable gears inside the air chamber, the airscrew being carried and retained by the vertical shaft on ball bearing secured to the end of said vertical shaft, and being otherwise supported, under, by a journal secured to the hub above and turning, below, on ball bearing secured to a structural member of the fuselage, which holds and retains the shaft and journal in place; and having also one or several additional motors and propellers to provide means for forward speed of advance, and most of the essential parts usually found in conventional airplanes in suitable arrangement consistent with said claims.

JOSEPH J. LERAY.